United States Patent
Mate et al.

(10) Patent No.: US 10,754,608 B2
(45) Date of Patent: Aug. 25, 2020

(54) AUGMENTED REALITY MIXING FOR DISTRIBUTED AUDIO CAPTURE

(71) Applicant: Nokia Technologies Oy, Espoo (FI)

(72) Inventors: Sujeet Shyamsundar Mate, Tampere (FI); Arto Lehtiniemi, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 28 days.

(21) Appl. No.: 15/363,458

(22) Filed: Nov. 29, 2016

(65) Prior Publication Data

US 2018/0150275 A1    May 31, 2018

(51) Int. Cl.
| | |
|---|---|
| H04R 3/00 | (2006.01) |
| G06F 3/16 | (2006.01) |
| H04H 60/04 | (2008.01) |
| G06F 3/01 | (2006.01) |
| H04S 7/00 | (2006.01) |
| H04R 1/40 | (2006.01) |
| H04R 29/00 | (2006.01) |

(52) U.S. Cl.
CPC .............. G06F 3/165 (2013.01); G06F 3/012 (2013.01); H04H 60/04 (2013.01); H04S 7/304 (2013.01); H04R 1/406 (2013.01); H04R 29/008 (2013.01); H04R 2201/401 (2013.01); H04S 2400/15 (2013.01)

(58) Field of Classification Search
CPC ................................ H04R 3/005; H04R 1/406
USPC .......................................................... 381/92
See application file for complete search history.

(56) References Cited

U.S. PATENT DOCUMENTS

| | | | |
|---|---|---|---|
| 9,384,737 B2 | 7/2016 | Lamb et al. | |
| 2002/0141597 A1* | 10/2002 | Wilcock | G06F 3/167 |
| | | | 381/61 |
| 2015/0049892 A1 | 2/2015 | Petersen et al. | |
| 2016/0080874 A1 | 3/2016 | Fullam et al. | |
| 2016/0138967 A1* | 5/2016 | Schuhmacher | G01H 17/00 |
| | | | 73/645 |
| 2016/0212538 A1 | 7/2016 | Fullam et al. | |

FOREIGN PATENT DOCUMENTS

WO    WO-2016001909 A1    1/2016

\* cited by examiner

*Primary Examiner* — Katherine A Faley
(74) *Attorney, Agent, or Firm* — Harrington & Smith

(57) ABSTRACT

A method including determining and tracking a position of an observed sound source to an observation point at an audio monitoring device; determining an identifier for the observed sound source based upon the determined and tracked position of the observed sound source; receiving distributed audio capture application signals at the audio monitoring device, where the distributed audio capture application signals include at least one audio mixing parameter for individual audio object channels and identifiers for respective audio objects of the individual audio object channels; and associating a first one of the individual audio object channels with the observed sound source based upon the received identifier of the first individual audio object channel and the determined identifier.

21 Claims, 16 Drawing Sheets

```
<Scene>
  <Objects>
      <Tracker-ID=TAGID>
          <Label>
          <Position>
              <Global reference>
                  <Magnetic North>Offset-value</Magnetic North>
                  <GPS-coordinates>Latitude,Longitude</GPS-coordinates>
              <Global reference>
              <DOA>
                  <Azimuth>azimuth-value-degrees</Azimuth>
                  <Elevation>Elevation-value-degrees</Elevation>
              <DOA>
          <Position>
          <Audio data>
              <Volume>Decibels</Volume>
              <Audio class>className</Audio class>
          <Audio data>
          <ContributionTo>
                      <Mix>Mix1</Mix>
                      <Mix>Mix2</Mix>
          <Contribution>
  <Mixes>
      <Mix=1>
          <Objects>
              <ObjectID=TrackerID1>
              <ObjectID=TrackerID2>
          <Objects>
      <Mix>
      <Mix=1>
          <Objects>
              <ObjectID=TrackerID1>
          <Objects>
      <Mix>
  <Mixes>
  <Rendering>
      <Viewpoint>Observation-Point-P1<Viewpoint>
      <Viewpoint>Observation-Point-M1<Viewpoint>
      <Viewpoint>Observation-Point-M2<Viewpoint>
  <Rendering>
</Scene>
```

- Audio capture scene information (Tracker-ID ... Contribution block)
- Mixes information (Mixes block)
- Rendering information (Rendering block)

FIG.8

AUGMENTED REALITY MIXING FOR DISTRIBUTED AUDIO CAPTURE

BACKGROUND

Technical Field

The exemplary and non-limiting embodiments relate generally to audio mixing and, more particularly, to audio mixing for an augmented or virtual reality recording.

Brief Description of Prior Developments

Audio mixing is known for mixing audio signal from multiple microphones. During recording for a virtual reality or augmented reality rendering, audio mixing may be adjusted.

SUMMARY

The following summary is merely intended to be exemplary. The summary is not intended to limit the scope of the claims.

In accordance with one aspect, an example method comprises determining a direction of arrival (DOA) from an observed audio object to an observation point at an augmented reality (AR) monitor; determining an identifier for the observed audio object based upon the determined direction of arrival; receiving distributed audio capture application signals at the augmented reality (AR) monitor, where the distributed audio capture application signals comprise gain level information for individual audio object channels and identifiers for respective audio objects of the individual audio object channels; and associating a first one of the individual audio object channels with the observed audio object based upon the received identifier of the first individual audio object channel and the determined identifier.

In accordance with another aspect, an example apparatus comprises at least one processor; and at least one non-transitory memory including computer program code, the at least one memory and the computer program code configured to, with the at least one processor, cause the apparatus to: determine a direction of arrival (DOA) from an observed audio object to an observation point of the apparatus, where the apparatus comprises an augmented reality (AR) monitor; determine an identifier for the observed audio object based upon the determined direction of arrival; receive distributed audio capture application signals at the apparatus, where the distributed audio capture application signals comprise gain level information for individual audio object channels and identifiers for respective audio objects of the individual audio object channels; and associate a first one of the individual audio object channels with the observed audio object based upon the received identifier of the first individual audio object channel and the determined identifier.

In accordance with another aspect, an example apparatus comprises a non-transitory program storage device readable by a machine, tangibly embodying a program of instructions executable by the machine for performing operations, the operations comprising: determining a direction of arrival (DOA) from an observed audio object to an observation point at an augmented reality (AR) monitor; determining an identifier for the observed audio object based upon the determined direction of arrival; based upon receiving distributed audio capture application signals at the augmented reality (AR) monitor, where the distributed audio capture application signals comprise gain level information for individual audio object channels and identifiers for respective audio objects of the individual audio object channels, associating a first one of the individual audio object channels with the observed audio object based upon the received identifier of the first individual audio object channel and the determined identifier.

BRIEF DESCRIPTION OF THE DRAWINGS

The foregoing aspects and other features are explained in the following description, taken in connection with the accompanying drawings, wherein:

FIG. 8 is an example of scene metadata signaling;

DETAILED DESCRIPTION OF EMBODIMENTS

Figure 1:
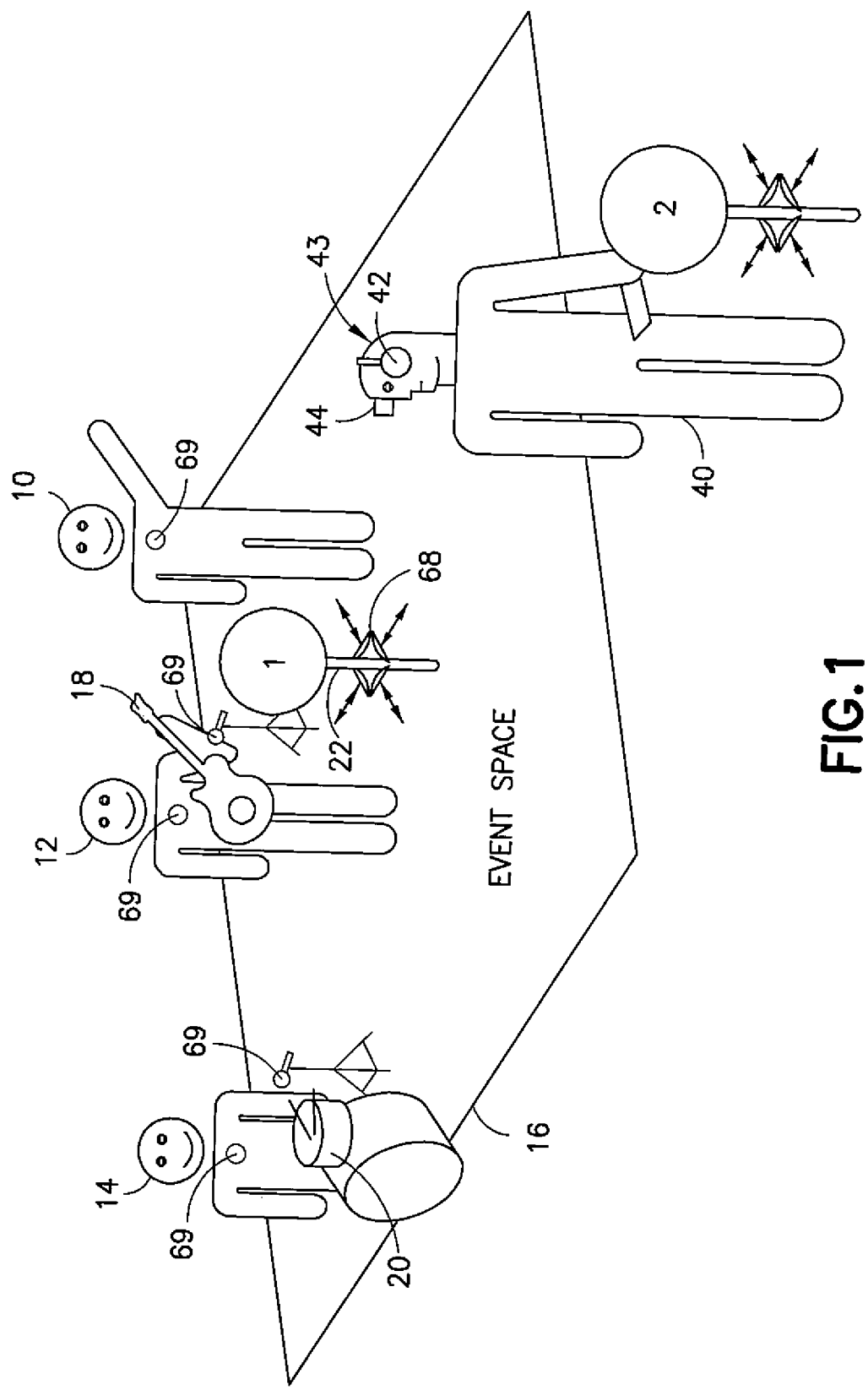
FIG. 1 is a diagram illustrating an event and recording situation.

Referring to FIG. 1, there is shown a diagram illustrating an event and recording situation incorporating features of an example embodiment. Although the features will be described with reference to the example embodiments shown in the drawings, it should be understood that features can be embodied in many alternate forms of embodiments.

Figure 2:
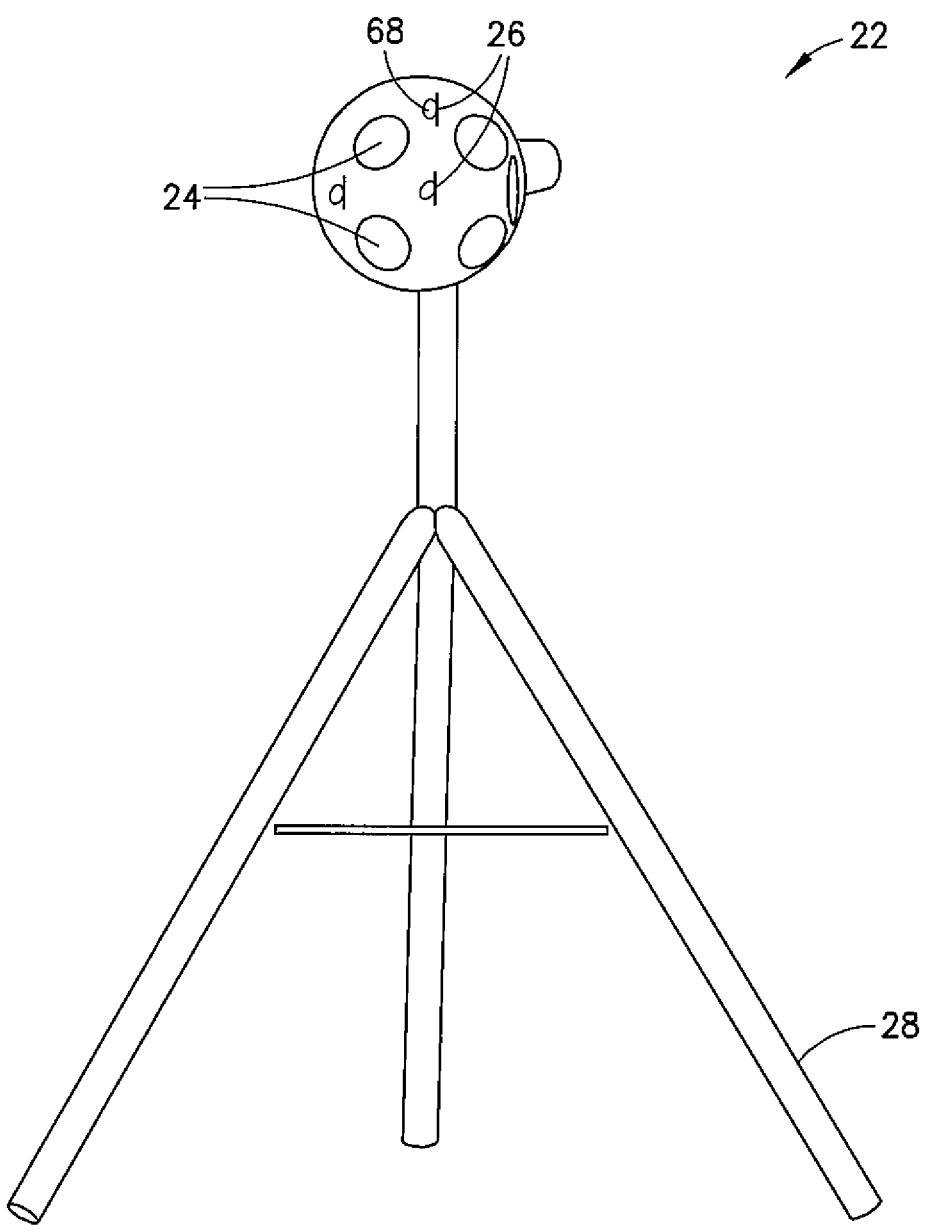
FIG. 2 is a diagram illustrating an example of an omni-directional content capture (OCC) device shown in FIG. 1.

The example situation of FIG. 1 comprises musical performers 10, 12, 14 located in an event space 16. Some of the performers 10, 12 comprises musical instruments 18, 20. The situation in the event space 16 is configured to be recorded by a device 22. The device 22 preferably comprises at least one microphone array and perhaps also at least one camera for video recording. FIG. 2 shows one example of the device 22 wherein the device has multiple cameras 24 and multiple microphones 26 as a unit attached to a tripod 28. One such device is the NOKIA OZO for example. However, in alternate embodiments any suitable recording device or plural devices could provided for the device 22, and the device might not comprise a camera.

Figure 3:
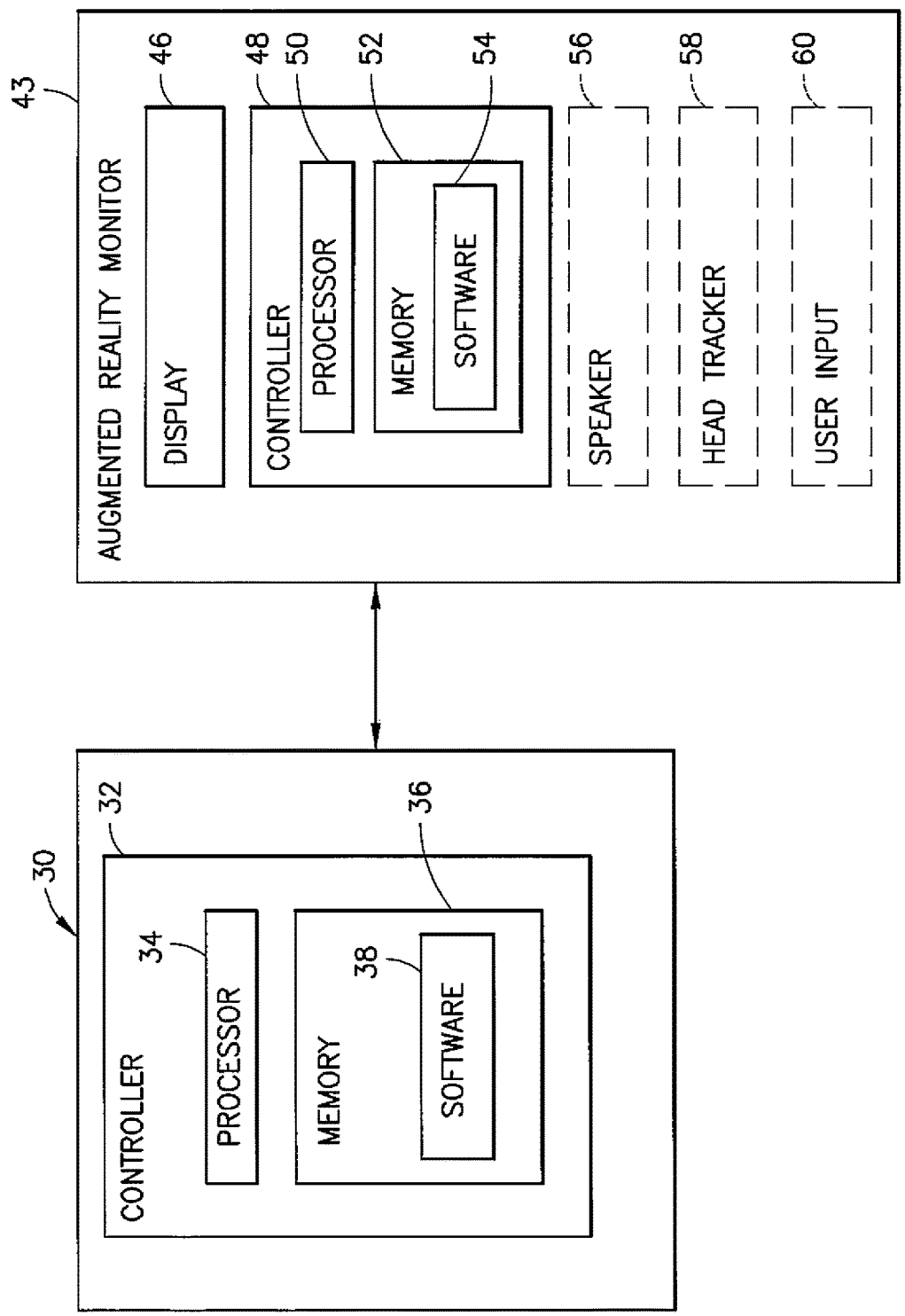
FIG. 3 is a diagram illustrating some components of an augmented reality monitor shown in FIG. 1 and an apparatus for missing audio signals.

Referring also to FIG. 3, signals from the device 22 may be transmitted to an apparatus 30, such as to be recorded. The signals may be audio signals or audio/visual signals. The apparatus 30 comprises a controller 32 which includes at least one processor 34 and at least one memory 36 including software or program code 38. The apparatus 30 is configured to be able to adjustably mix the audio signals from the device 22 for recording and/or rendering, such as to a user 40. In this example the user 40 is shown outside the event space 16. However, the user is located at the event space 16 and may move around the event space (and perhaps into the event space).

As seen in FIG. 1, the user 40 has two headsets; headphones 42 and a virtual reality (VR) or augmented reality (AR) headset 44. In alternate example embodiments, any suitable audio and video devices for the user 40 to hear audio sound and view a virtual reality (VR) or augmented reality (AR) rendering could be provided. The headphones 42 and reality headset 44 could be a single device or multiple devices for example. Referring back to FIG. 3, the headphones 42 reality headset 44 are schematically illustrated as being at least part of the augmented reality (AR) monitor 43 which includes a display 46 and a controller 48. The controller 48 comprises at least one processor 50 and at least one memory 52 comprising software or program code 54. The augmented reality (AR) monitor 43 may comprise one or more speakers 56, a head tracker 58 and a user input 60. However, one or more of these could be provided separately.

The event situation in the event space 16, such as a musical concert for example, may be visually viewed by the user 40 through the visor of the AR monitor 43. Alternatively, if the user 40 is using a VR monitor, the musical concert may be visually viewed by the user 40 on the visor of the VR monitor where the displayed images are captured, such as via the cameras of the device 22 for example. The user 40 may move his/her head to change the field of view he/she is viewing, such as from the performer 10 to the performer 14 for example. Similarly, when the user moves his/her head, the audio signals played on the headphones 42 or speakers 56 may also change to adjust for a more realistic experience.

Figure 4:
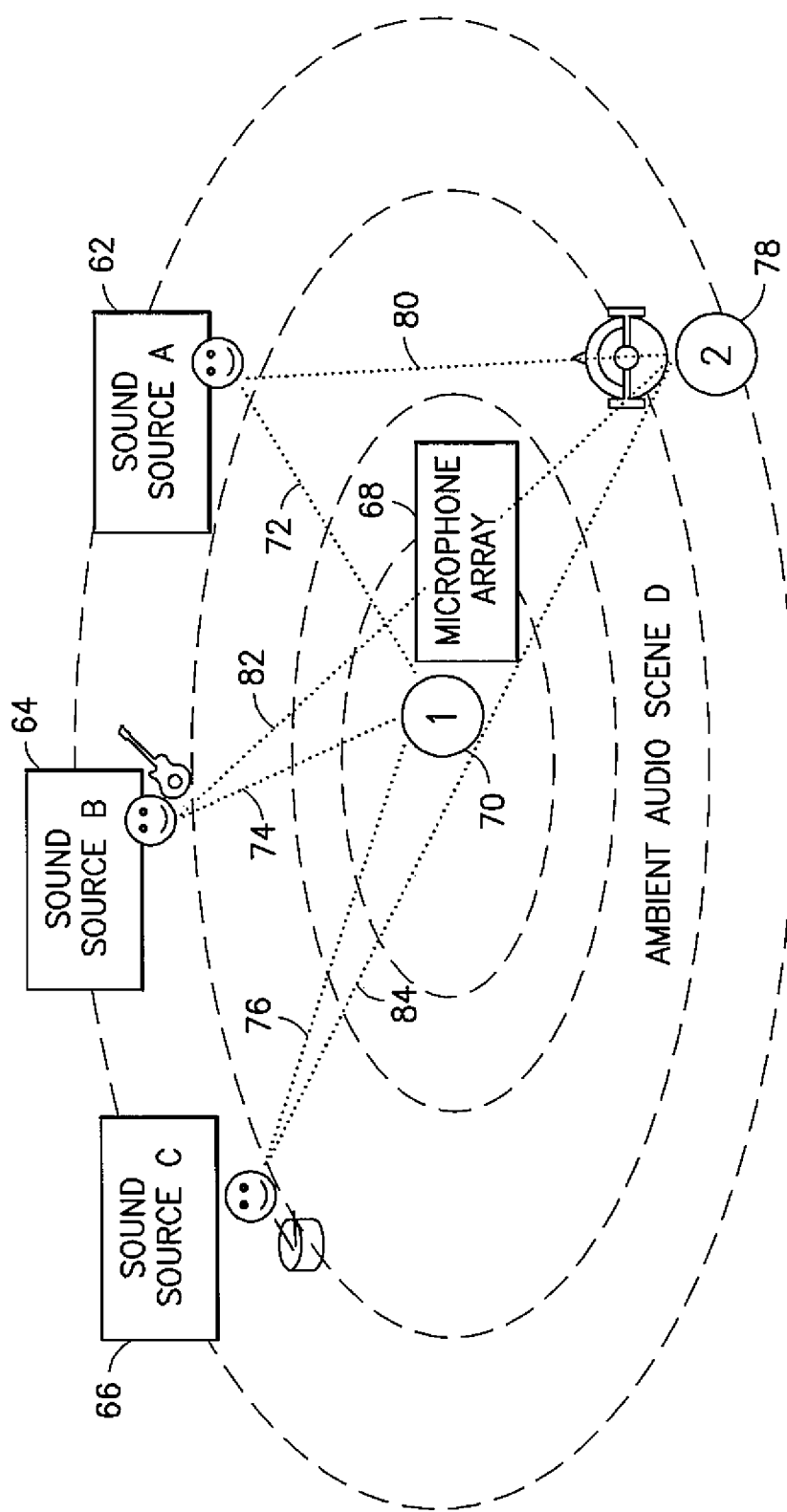
FIG. 4 is a diagram illustrating directions of arrivals (DOA) for the situation shown in FIG. 1.
Figure 5:
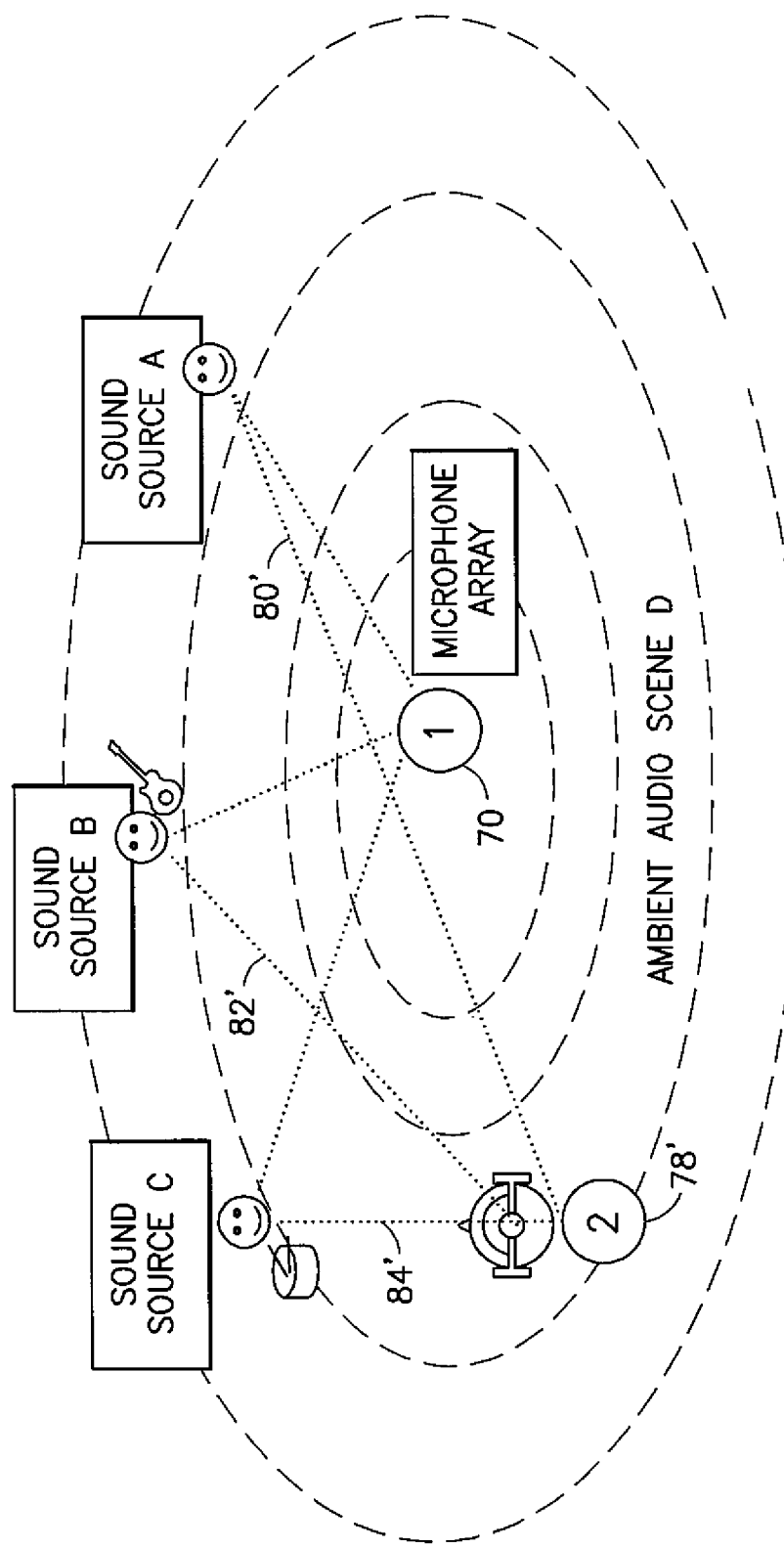
FIG. 5 is a diagram similar to FIG. 4 showing the user moved to a different location with different directions of arrivals (DOA)

Referring to FIG. 4, audio objects (sound source A, sound source B, sound source C) 62, 64, 66 are shown corresponding to the sound from the performers and instruments 10, 12 and 18, and 14 and 20, respectively, as recorded by the microphone array 68 of the device 22 at a first observation point 70. Ambient audio is also shown as D. Lines 72, 74, 76 illustrate a direction of arrival (DOA) of the sound from the audio objects (A, B, C) 62, 64, 66 to the microphone array 68 at the first observation point 70 at the event space 16. The user 40 is illustrated at location 78 corresponding to a second observation point. Thus, the direction of arrival (DOA) of the sound from the audio objects (A, B, C) 62, 64, 66 is perceived as illustrated by lines 80, 82, 84. In FIG. 5, wherein the location of the user 40 has changed to a new location 78', the direction of arrival (DOA) of the sound from the audio objects (A, B, C) 62, 64, 66 is perceived as illustrated by lines 80', 82', 84'.

Features as described herein may be used with a method for co-operative tracking of audio object channels, which may be done by signaling audio object metadata (label, level, mix-composition, etc.) from a distributed audio capture application (such as a Spatial Audio Mixer (SAM) for example) to the AR (Augmented Reality) monitoring device. This may be used to enable free movement of the monitoring user 40 around the venue. In an example embodiment, the audio channels and the tracker-ID association information may be signaled to the AR monitor 43.

The AR based monitoring of the distributed audio capture scene may be performed in combination with head tracking. This allows the monitoring user to interact with various individual audio objects or mixes by implicitly selecting them via the head tracking. The mode (such as by using an object identifier versus a mix identifier) and the action may be signaled by the AR application at the AR monitor 43 to the distributed audio capture application at the apparatus 30. In an example embodiment, the user 40 interactions with the capture scene (to modify audio object channel characteristics, mix characteristics, tracked source position, etc.) may be signaled to the distributed capture application in the apparatus 30.

In different example embodiments of the implementation, the AR application may be used to signal the delivery of monitor mix to the AR monitor 43 corresponding to:
  a full production monitor mix for the user's preview;
  a mix generated from grouped object channels depending on a pointing direction of the AR monitor 43; or
  a localized preview from the loudspeakers in that particular location (such as, for example, to compare between the production mix and the rendered experience in a particular part of the venue).

Features as described herein may be used for monitoring events in general, and more specifically for audio mix monitoring in particular. FIGS. 1 and 4 show one example of an expected usage scenario. The audio capture consists of one or more microphone arrays 68, referred to as an observation point (OP) and multiple close-up microphones 69 for capturing the sound sources of interest 10-12 and 18-20. The close-up microphones 69 and/or the sound sources 10-12 and 18-20 may be tracked using a suitable position tracking method. Any method which can provide DOA (direction of arrival) information is sufficient. The observation point (OP) labeled as "1" corresponds to the microphone array for the omni-directional content capture (OCC) device and a coaxial position tracking locator such as, for example, HAIP (High Accuracy Indoor Positioning). One type of HAIP is 360 HAIP. The OP labeled "2" corresponds to a position tracking device associated with the AR audio mix monitoring user. OP 2 need not have a microphone array, it only needs a DOA providing position tracking device, such as a conventional HAIP locator or a miniaturized HAIP locator for example, or any suitable position tracking device. In some embodiments, HAIP could be replaced with audio/visual/multimodal object tracking and recognition systems in the first and/or second observation points. The positioning device size can be chosen taking into account the portability, size, weight, etc. The user 40 may stand besides the HAIP locator or, in some example embodiments, the HAIP positioning device can also be head-mounted or part of the AR monitor device. The user 40 may monitor the event venue via the AR device 43 such as, for example, a Head Mounted Display (HMD) for VR in a pass-through mode or a dedicated AR device such as Google-Glass for example. The user 40 may provide inputs to the AR monitoring system via a suitable input device such as, for example, a hand-held device, a joy-stick, a mobile phone, a motion and gesture sensing arm-band, an input interface on the HMD, etc.). The user's head position may be tracked with the AR device or with a dedicated inertial headtracker mounted on the monitor audio mix rendering headset.

Figure 6:
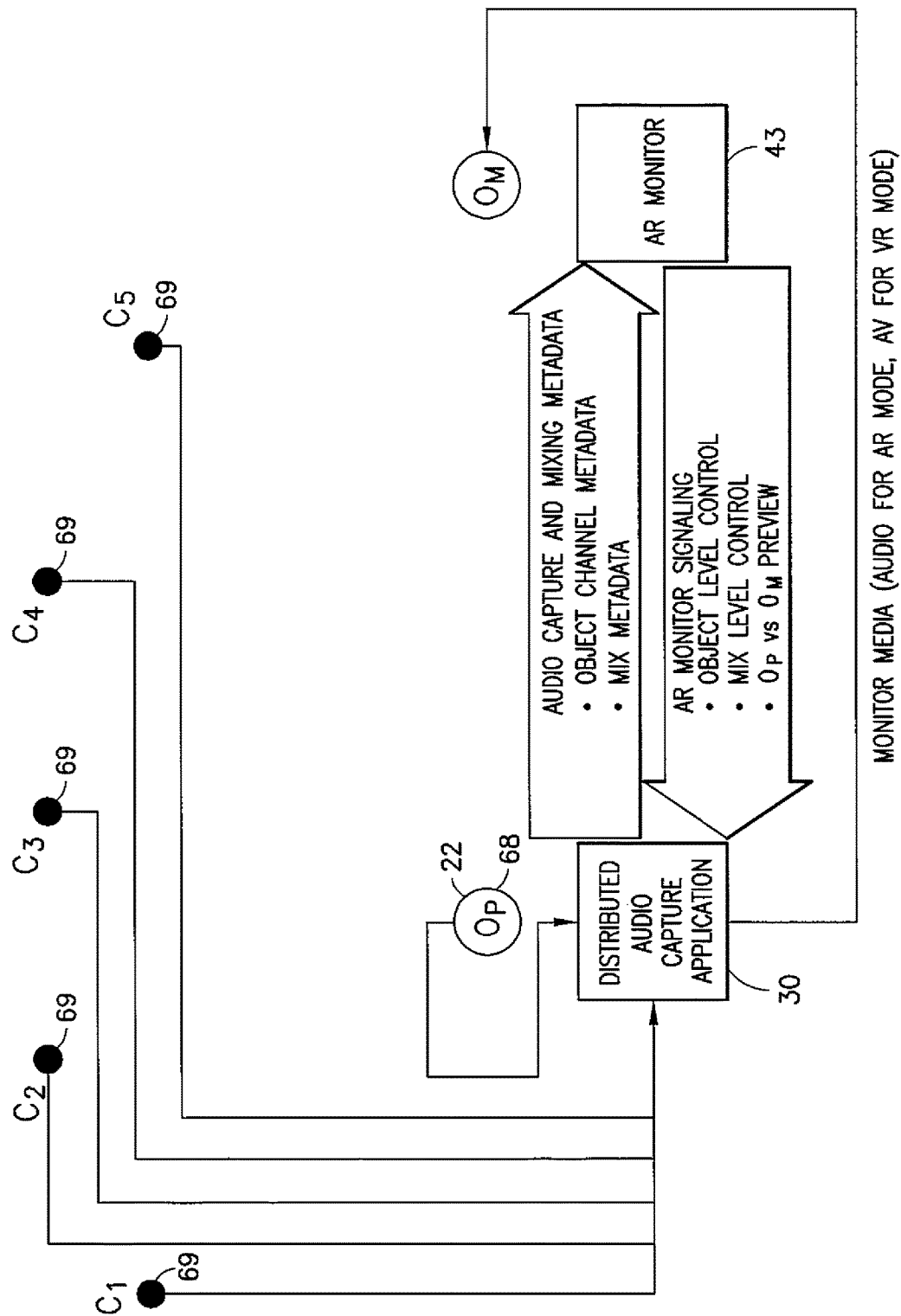
FIG. 6 is a diagram illustrating different microphones connected to the mixing apparatus shown in FIG. 3 and shown an example of communications between the apparatus and the augmented reality monitor.

FIG. 6 provides an overview of the AR media monitoring system. The distributed audio capture application in the apparatus 30, such as SAM for example, receives audio data from the close-up tracked sound sources 69, labeled $C_1$-$C_5$ in FIG. 6, and the OCC (omni-directional content capture) microphone array 68 at production observation point $O_P$. In one example embodiment, the tracked sound sources 69 are each associated with a position tracking HAIP tag. The AR monitor device 43 may also receive/see a visual feed from an input camera of the AR monitor device 43. The AR monitor 43, as well as the microphone array capture device 22, may also each have a position tracking device for tracking the position of the tracked sound sources 69.

Figure 7:
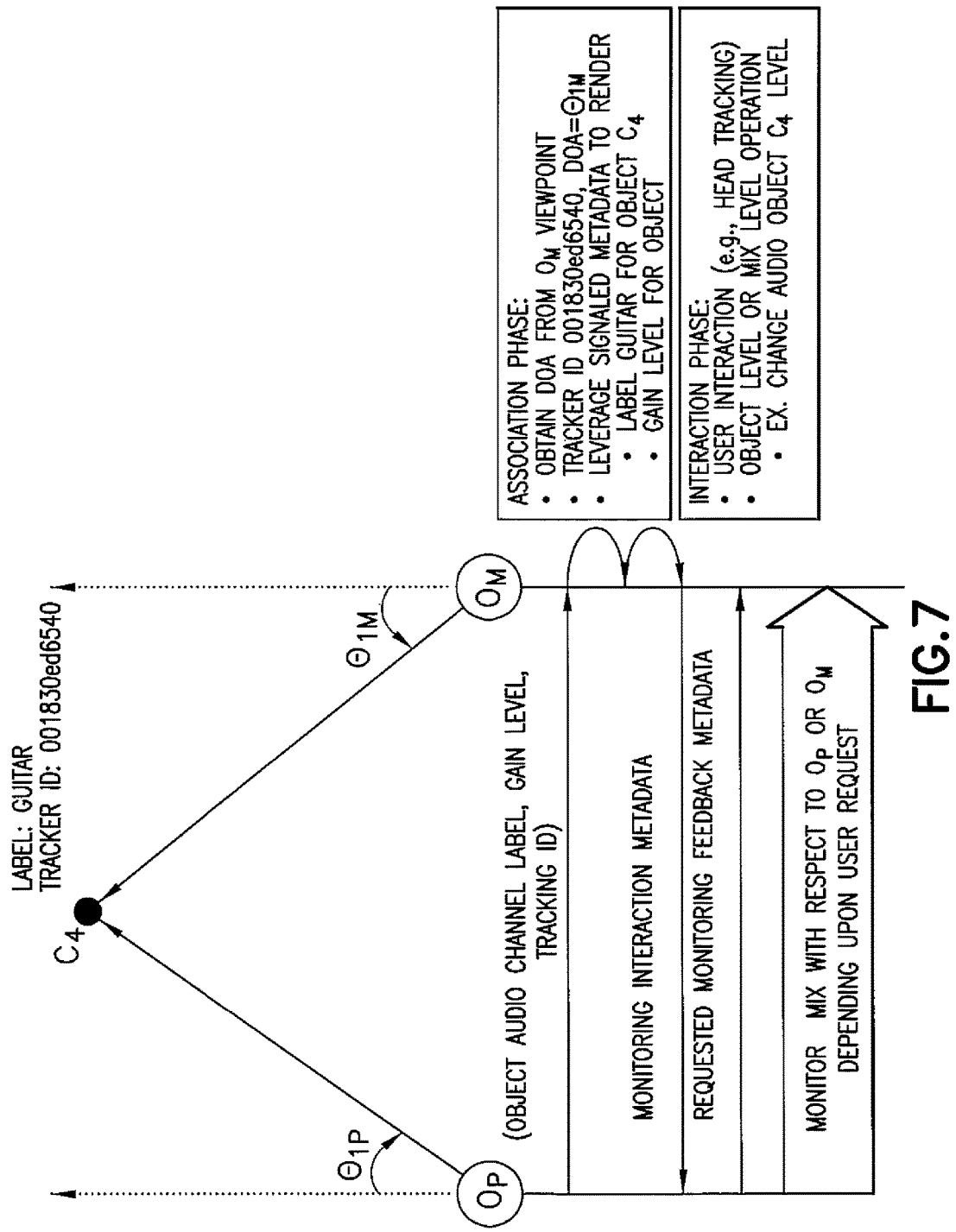
FIG. 7 is a diagram illustrating an example method using an association phase and an interaction phase.

The distributed capture application at the apparatus 30 (with the help of user input for example) may associate the position tags (tracker-IDs) with the corresponding channels of the audio objects. For simplicity, in addition to the association, the distributed capture application user may also provide labels for each channel. The channel labels provide an intuitive interface for understanding the association between the sound source and the audio object channel. Furthermore, the distributed capture application may configure custom monitor mixes such as, for example, a monitor mix of the full production, a monitor mix for each instrument (which can consist of mix of multiple object channels and the microphone array channels). These set of mixes may provide a comprehensive, as well as specialized, view of the on-going audio production. Features as described herein may be used to control, as well as monitor, the audio production from the AR monitor device 43. Referring also to FIG. 7, this may be operated in phases including an association phase and an interaction phase.

Association Phase:

In an example AR monitoring method, the position tracking at "1" as well as at "2" have the visibility to the same set of audio sources 10-14 and 18-20. The HAIP locators at "1" as well as "2" can see the same set of tracker HAIP tags at the microphones 69 for example. Consequently, both of the HAIP locators see the HAIP tags in a "correct position" taking into account the perspective difference at "1" and "2". Direction of Arrival (DOA) information for each of the visible tracker IDs may be recorded at "2". The distributed capture application at the apparatus 30 may signal the tracker-IDs and object channel labels, and the gain levels for the individual audio object channels to the AR monitor application in the AR monitor 43.

The tracker-ID information may be used to associate the label and gain level information for each of the individual audio object channels in the AR monitor application at the AR monitor device 43 and rendered for the user 40. This provides a transparent interface for viewing, monitoring and mixing the audio production. An example of a more detailed scene metadata description can be seen in FIG. 8. The example metadata shown in FIG. 8 is representative of an example and may, of course, be modified based on application specific requirements.

Interaction Phase

The next step in the example of FIG. 7 is the interaction phase. In this phase the monitoring user 40 consumes and may change the monitored content. Furthermore, the user 40 may chose to modify the monitor parameters or mixing parameters to better suite his/her desires. The user input for a change in the monitored data, or a change, is signaled from the AR monitor 43 to the distributed capture application at the apparatus 30 which generates the different monitoring mixes.

To facilitate the operation at audio object channel level or the mix level, additional metadata may be signaled from the distributed capture application at the apparatus 30 to the AR monitor device 43. This metadata corresponds to the contribution of each of the audio object channels to one or more mixes. This provides an opportunity for the monitoring user 40 to have wider and deeper access to the different views of the production as will be illustrated with respect to FIGS. 9-12.

Figure 9:
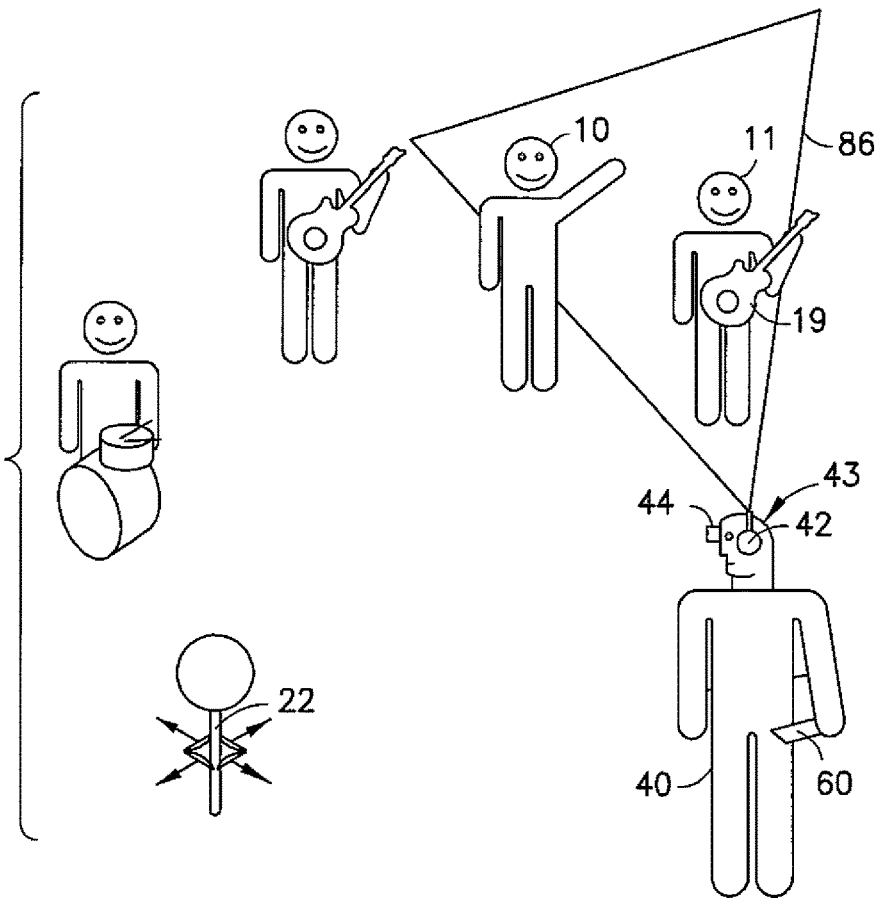
FIG. 9 is a diagram similar to FIG. 1 and illustrating a field of view of the user.
Figure 10:
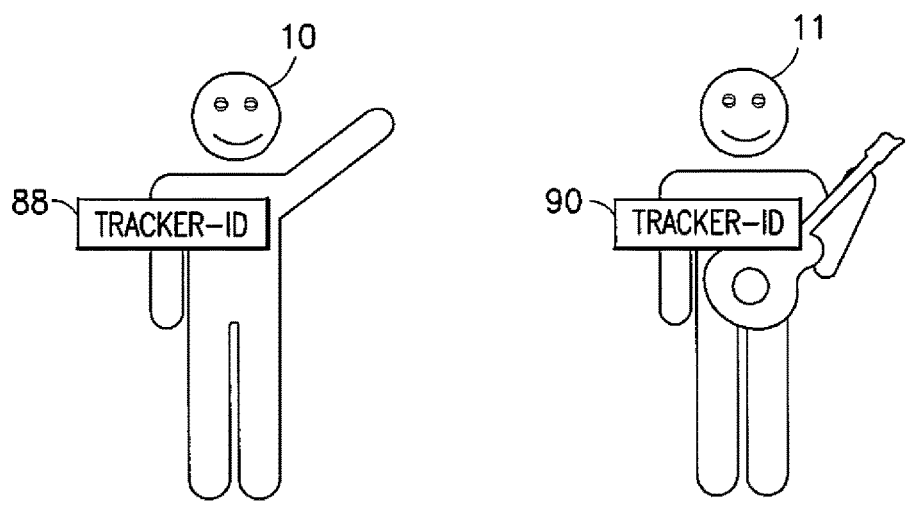
FIGS. 10-12 are examples of different types of display images on the augmented reality (AR) monitor for the field of view shown in FIG. 9.
Figure 11:
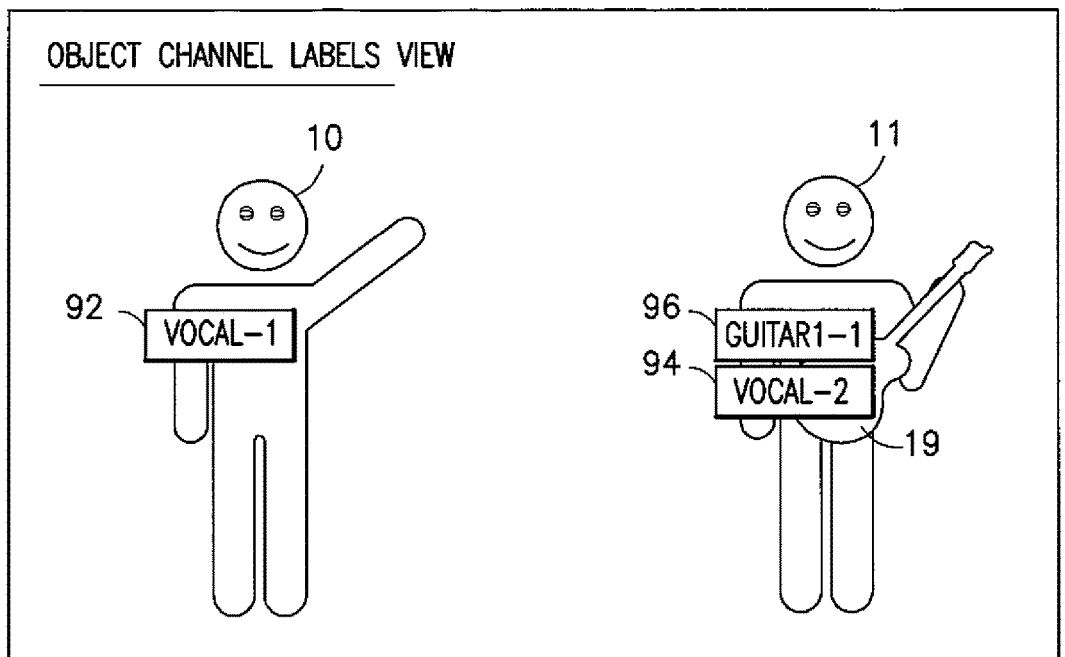
Figure 12:
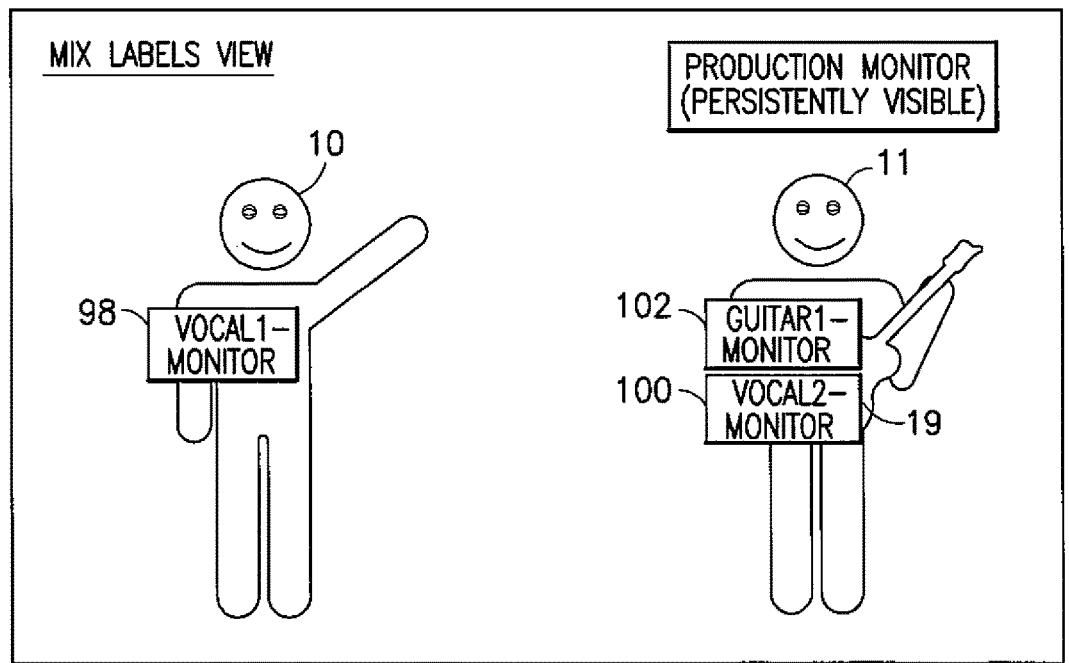

FIG. 9 illustrated the user 40 and his/her field of view 86 on the display 46 of the AR monitor device 43 at a particular instant in time. The user 40 can see the performers 10, 11 and instrument 19 at this particular instant in time. FIG. 10 illustrates a first view both through the display 46 and on the display 46 comprising a position tracking view where identifiers 88, 90 are shown for each of the performers 10, 11 respectively. Performers 10, 11 and instrument 19 are seen by the user 40 through the display 46. Identifiers 88, 90 are seen by the user 40 on the display 46. In this example a tracker-ID for each performer 10, 11 is shown, such as the tracker-ID of the HAIP tags for each performer. FIG. 11 illustrates a second view on the display 46 comprising an object channel labels view where labels 92, 94, 96 are shown for each of the audio objects 10, 11, 19 respectively. FIG. 12 illustrates a third view on the display 46 comprising a mix labels view with the labels 98, 100, 102 for channel mixes, respectively, for the audio objects 10, 11, 19.

The signaling of metadata in the association and interaction phase may be done, for example, in XML/JSON body signaled using HTTP protocol. The monitor mix may be transmitted directly from the distributed audio capture application in the apparatus 30 to the AR monitor device 43 and the monitoring user 40 via a wireless link or a wireline link. The wireless link may comprise, for example, wireless monitor ear plugs.

Figure 13:
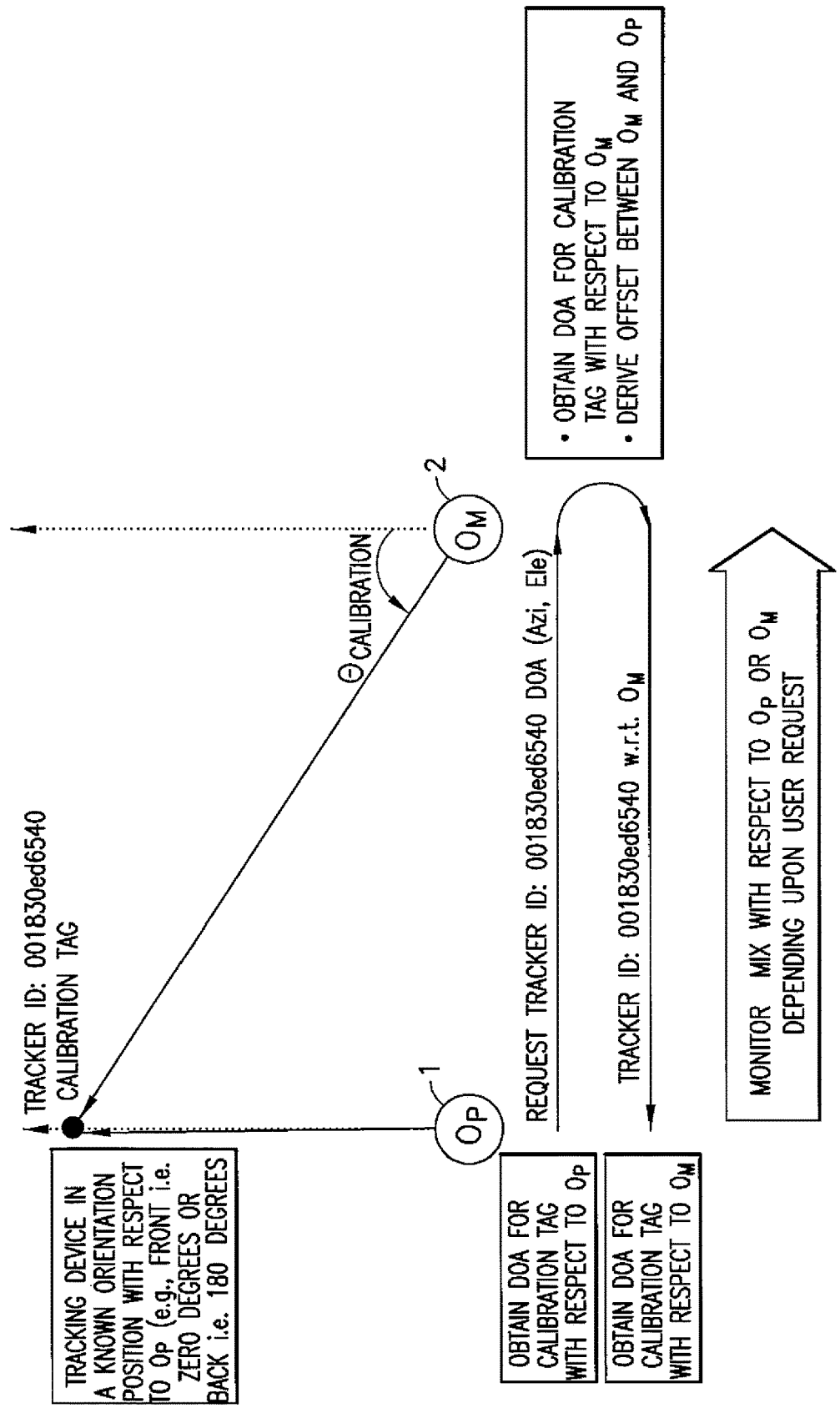
FIG. 13 is a diagram illustrating an example method.

In yet another example embodiment, the user 40 may choose to experience the monitor mix based on the AR observation point orientation shown as $O_M$ in FIGS. 6-7. The user 40 may, thus, experience the monitor mix based on the AR observation point orientation $O_M$ instead of the production observation point $O_P$. To facilitate this experience, an initial calibration phase may be used to align the reference axis of the AR monitor device 43 and the distributed capture apparatus 22. Referring also to FIG. 13, the calibration phase may consist of a single request to obtain the DOA information using at least one position tracking tag by placing it such that:

the calibration tag is visible in both the observation points ($O_P$ and $O_M$); and the calibration tag is at a known DOA with respect to $O_M$ or $O_P$.

Figure 14:
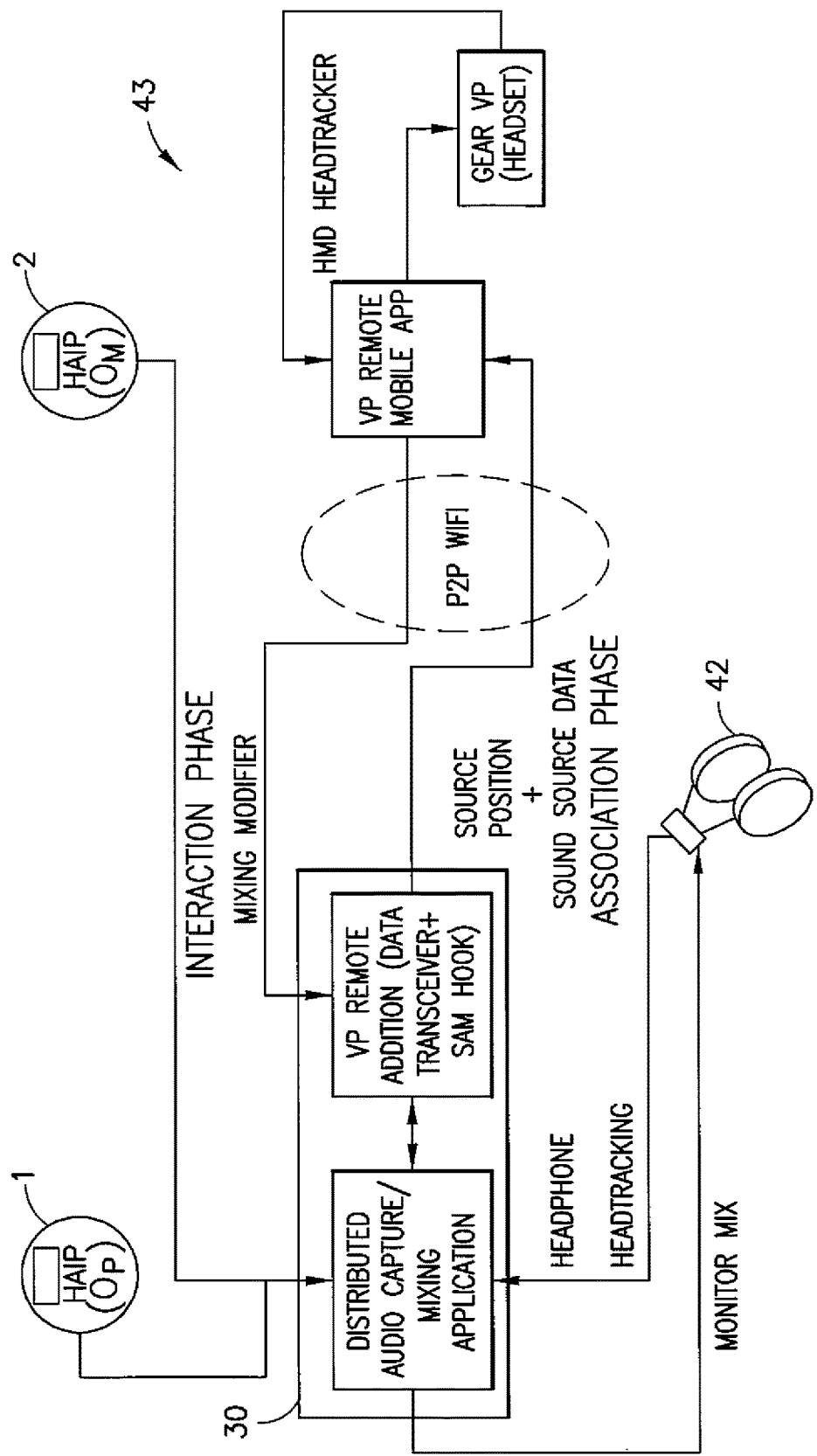
FIG. 14 is a diagram illustrating components used for one example of an interaction phase and an association phase method.
Figure 15:
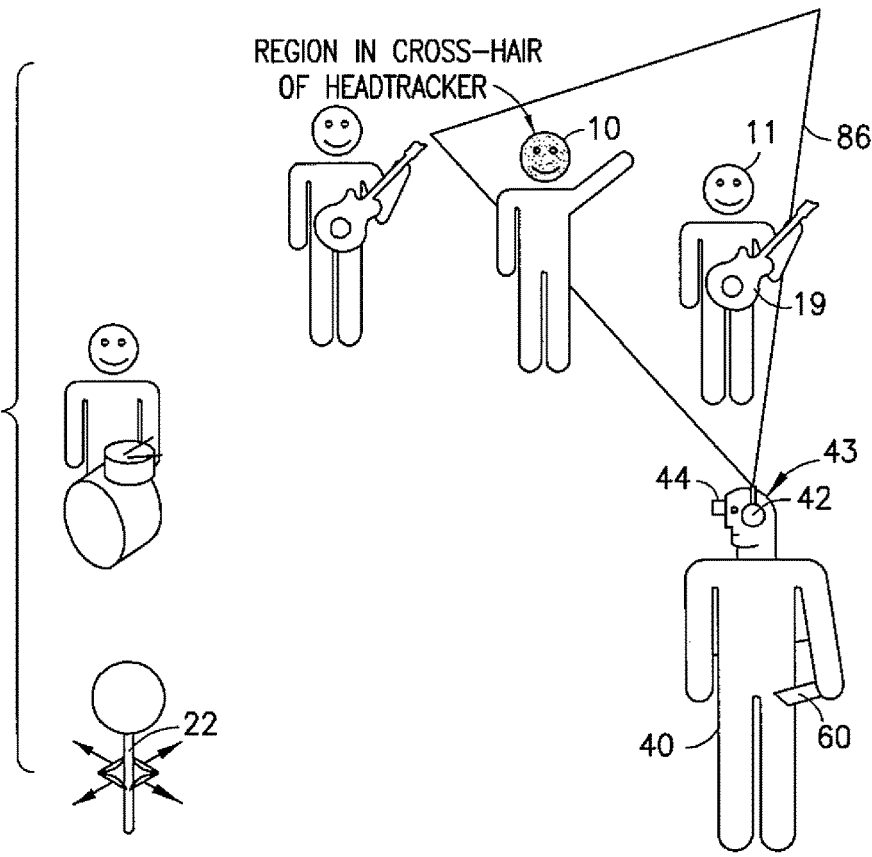
FIG. 15 is a diagram similar to FIG. 9 showing a performer highlighted as being selected by the user.

Even though the observation points $O_P$ and $O_M$ are two physically different points in space, the implementation may involve signaling between software components residing on the same device. An example of the software system implementation system overview is shown in FIG. 14. The AR monitor 43 may be added as an enhancement to any distributed audio capture or, for that matter, any media monitoring application. This approach provides an easily pluggable AR system approach which is not single application dependent.

Figure 16:
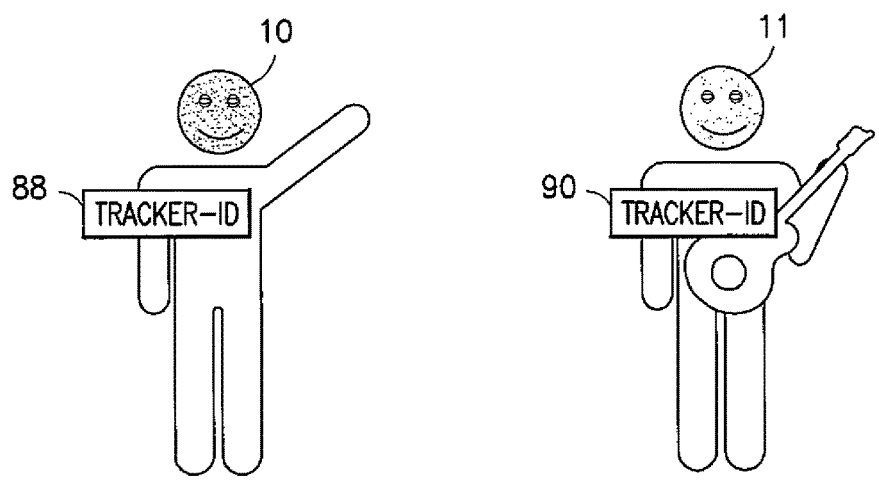
FIGS. 16-18 are examples of different types of display images on the augmented reality (AR) monitor for the field of view and selected performer shown in FIG. 15.
Figure 17:
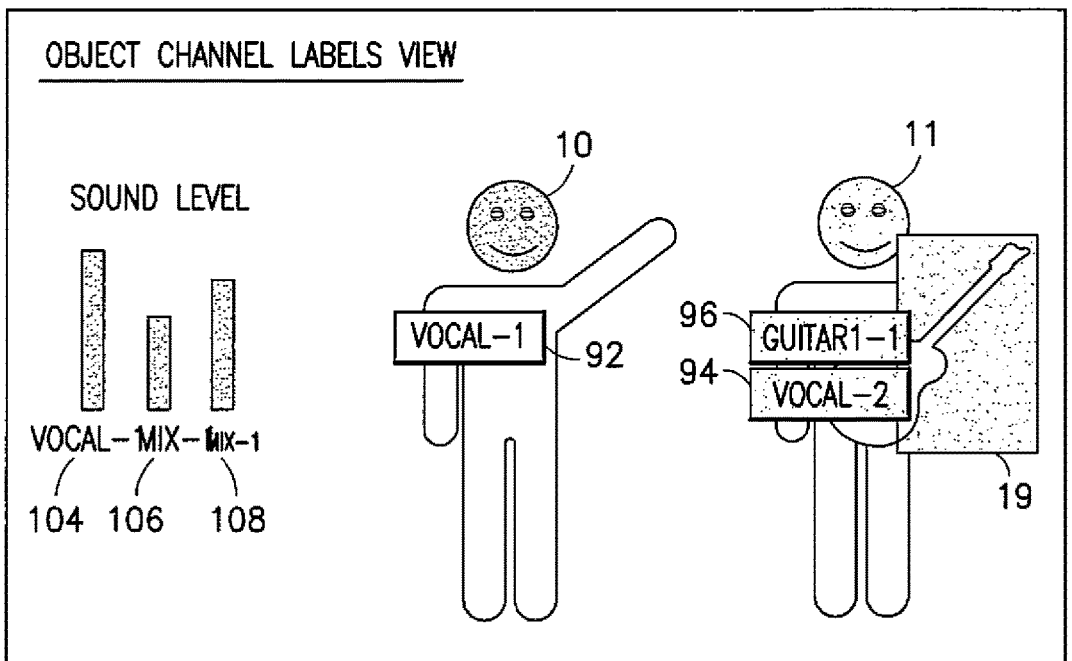
Figure 18:
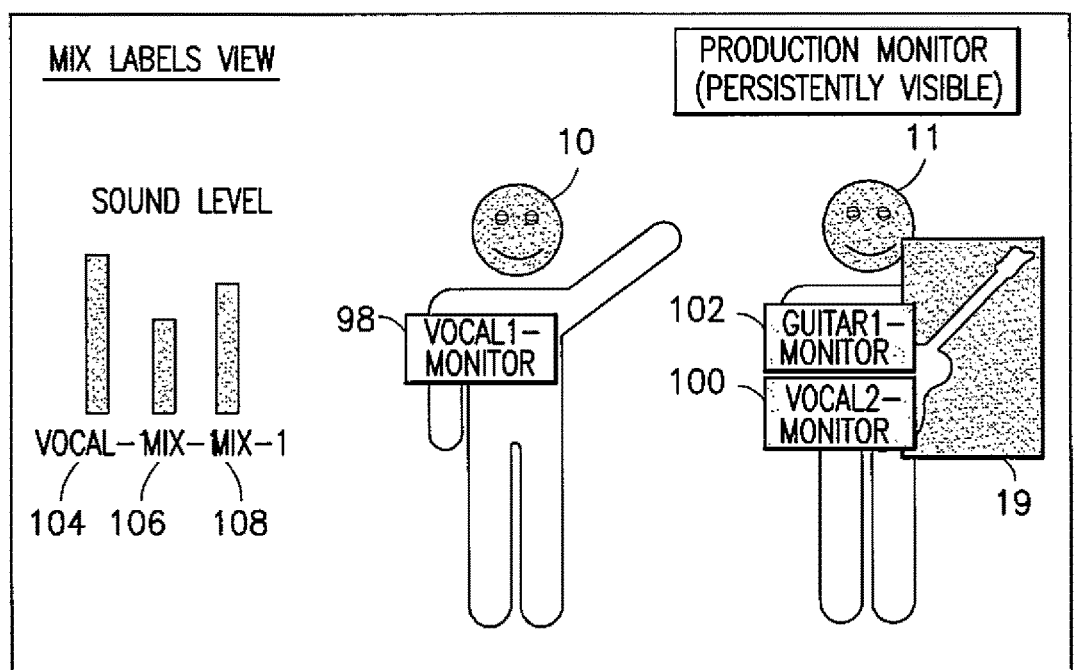

Referring also to FIGS. 15-18, an example of an alternate embodiment is shown. In this example, a head tracker based individual position track selection is used. In this example cross-hairs of the headtracker are be centered on the performer 10. Thus, the head of the performer 10 is shown shaded versus the view shown in FIG. 9. The view shown in FIG. 16 is the same as shown in FIG. 10 for the position tracking view except for the cross-hairs or shading. The object channel labels view shown in FIG. 17 differs from that shown in FIG. 11 with the addition of sound levels 104, 106, 108 being shown for the three audio objects 10, 11, 19, and comprises the cross-hairs or shading indicating the headtracker being centered on the performer 10. The mix labels view shown in FIG. 18 differs from that shown in FIG. 12 with the addition of sound levels 104, 106, 108 being shown for the three audio objects 10, 11, 19, and comprises the cross-hairs or shading indicating the headtracker being centered on the performer 10.

Figure 19:
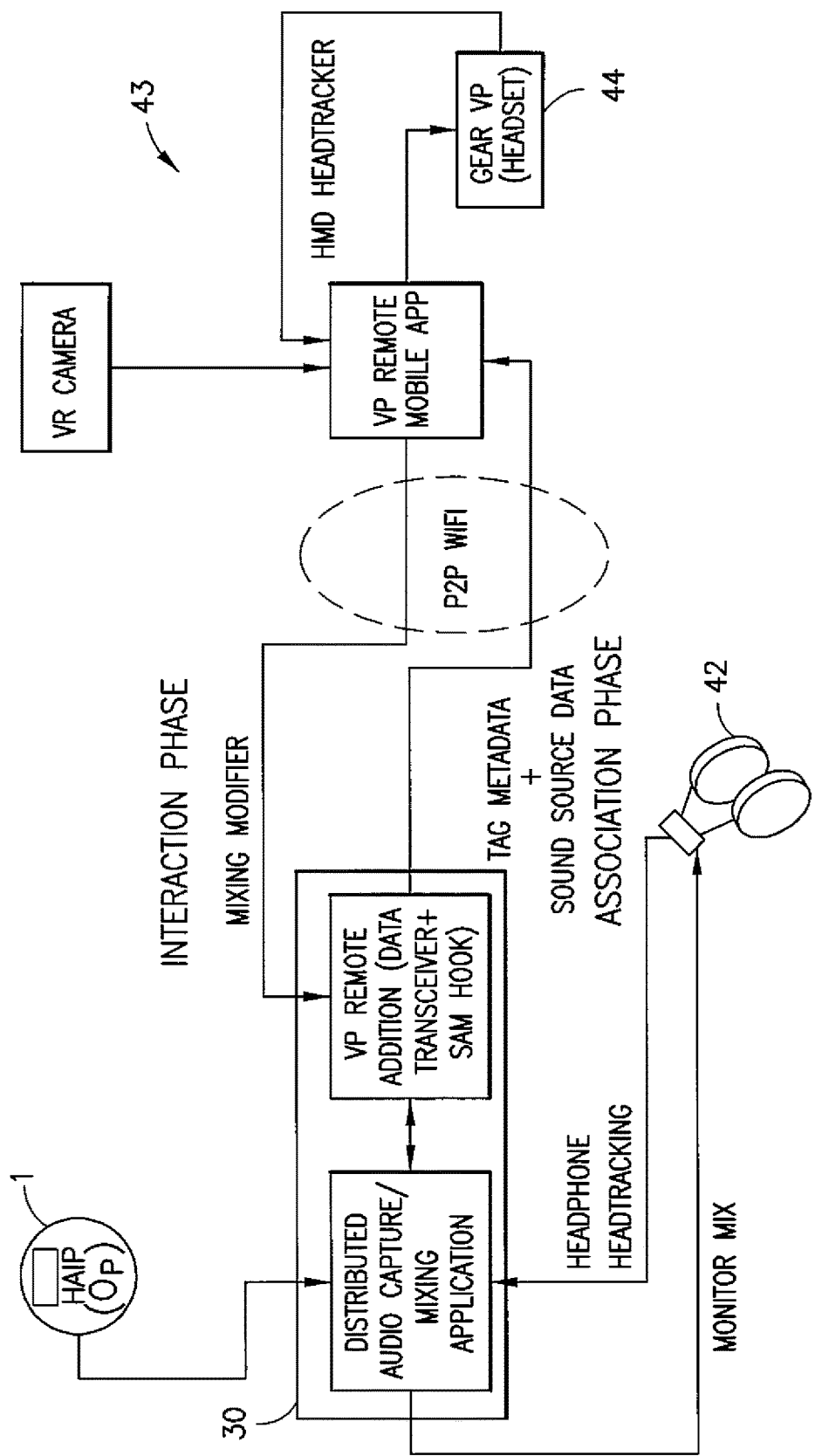
FIG. 19 is a diagram illustrating components used for another example of an interaction phase and an association phase method.

FIG. 19 shows the extension of adding the VR content rendering capability to the AR monitor 43. This configuration allows for full content monitoring in AR as well as VR, although at higher computational load to the rendering mobile device.

Features as described herein allow for combining the benefits of VR mixing (visual feedback about the scene makes it intuitive and easier to spot errors) and Non-VR mixing (free movement, situational awareness, lower physical footprint). Thus, it provides situational awareness, free movement, and clear visual feedback about the scene details. Features as described herein require less positioning details. Compared to conventional systems which requires azimuth, elevation and distance information, features as described herein only need DOA (azimuth and elevation for example). This means a wider range of techniques such as audio based DOA analysis and visual content based DOA. In case of radio based positioning, the proposed method may use only two HAIP locators which is much less than the many more HAIP locators which would be needed for obtaining DOA information (azimuth, elevation and distance). With features as described herein the same application/interface can be used as VR mixing/monitoring as well as AR mixing/monitoring by just signaling the monitoring viewpoint reference from the VR camera (at the content capture observation point) to the AR monitor (monitoring observation point), such as depending on the hardware support. With features as described herein a lightweight AR interface such as a Google-Glass type of device can also be leveraged. This allows for using a lower footprint head mounted display (HMD) for providing improved usability of the AR monitor.

Features as described herein may be used with distributed capture, mixing and monitoring of audio, from multiple close-up microphones and at least one microphone array. The close-up microphone capturing sources may be tracked in order to facilitate realistic rendering of the tracked sound sources in a final mix. This may be used to provide an intuitive, flexible method for monitoring of a complex audio scene, consisting of dynamic sound sources as well as a microphone array(s). This may correspond, for example, to a moving omni-directional content capture device(s) for VR content creation. An example of an omni-directional content capture device(s) for VR content creation is the NOKIA OZO. A moving capture device provides advantages over a conventional omni-directional content capture device devoted for static sound sources. Conventional VR based monitoring solutions, due to the inherent nature, are computationally heavy and inhibit movement of the monitoring user around the monitored space. Features as described herein avoid these deficiencies to allow for a non-static use case.

Features as described herein may be used for ensuring high quality end result by providing detailed information of the event venue for professional content creation. Features as described herein may be used have multiple individually operated monitors such as smartphones for example which are mobile. A mobile monitor such as user 40 may preview the content experience from different listening positions freely without restrictions on movements.

Conventional VR recording imposes restrictions, in terms of movement of the monitoring user, as well as additional computational resource cost to receive/decode/render a panoramic video feed are reduced. A non-VR rendering, such as audio mixing without any visual feedback for example, makes it more difficult to detect problems in position tracking, mismatch between the intended position track, and tracked sound source audio channel. Thus, features as described herein reduce these types of problems by allowing a VR rendering to be used during mixing. Features as described herein also provide the ability to have positioning systems with the possibility of providing DOA only (without distance) which are less complex and need less hardware. This reduces significant setup/maintenance cost as well as overall system complexity. A drawback in a conventional approach is that the user needs to be in a static location, or remove the VR headset, before changing position. Consequently this is less suitable for a mixing monitor while being on the move.

Figure 20:
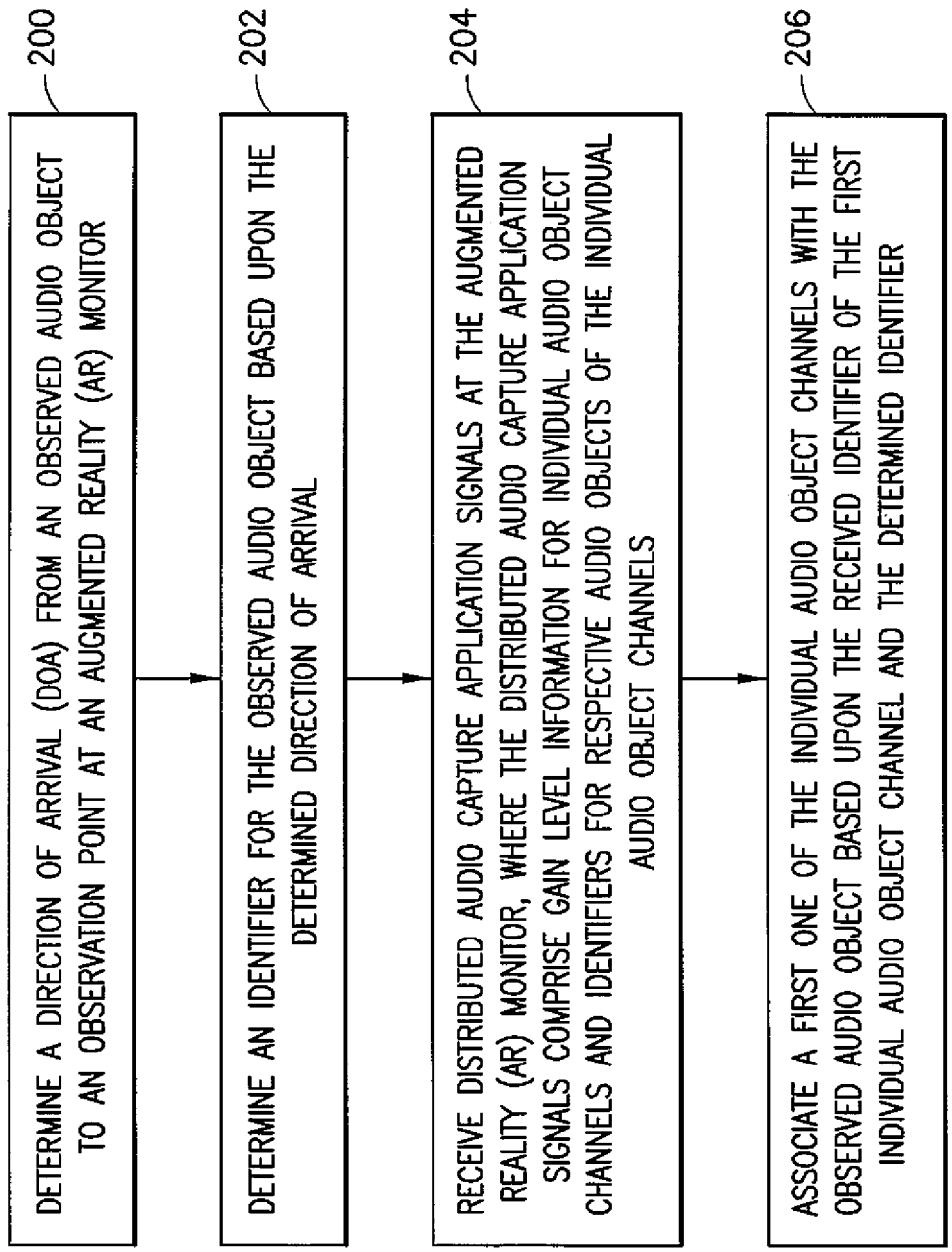
FIG. 20 is a diagram illustrating an example method.

Referring also to FIG. 20, an example method may comprise determining a direction of arrival (DOA) from an observed audio object to an observation point at an augmented reality (AR) monitor as indicated by block 200; determining an identifier for the observed audio object based upon the determined direction of arrival as indicated by block 202; receiving distributed audio capture application signals at the augmented reality (AR) monitor, where the distributed audio capture application signals comprise gain level information for individual audio object channels and identifiers for respective audio objects of the individual audio object channels as indicated by block 204; and associating a first one of the individual audio object channels with the observed audio object based upon the received identifier of the first individual audio object channel and the determined identifier as indicated by block 206.

The method may further comprise, based upon the associating, rendering the first individual audio object channel to a user of the augmented reality (AR) monitor. The method may further comprise, based upon the associating, displaying on the augmented reality (AR) monitor a label with the observed audio object. The method may further comprise: determining an identifier for a second observed audio object based upon the determined direction of arrival; and displaying on the augmented reality (AR) monitor a label for the second observed audio object corresponding to a second one of the individual audio object channels. The method may further comprise, based upon the associating, displaying on the augmented reality (AR) monitor the gain level information for the first individual audio object channel. The distributed audio capture application signals may comprise mix metadata for mixing the individual audio object channels, and the method further comprises transmitting from the augmented reality (AR) monitor input from a user for changing the mix metadata. The input may comprise at least one of: head tracking information, audio object level control information, observation point selection information, and selection of an individual audio object or a mix of audio objects. The method may further comprise receiving requested additional audio object metadata based upon the transmitted input from the user. The method may further comprise, based upon movement of the augmented reality (AR) monitor from a first location to a second different location, determining a new direction of arrival of the observed audio object. The determining of the direction of arrival (DOA) may comprise use of an image from a camera at the augmented reality (AR) monitor.

An example apparatus may comprise at least one processor; and at least one non-transitory memory including computer program code, the at least one memory and the computer program code configured to, with the at least one processor, cause the apparatus to: determine a direction of arrival (DOA) from an observed audio object to an observation point of the apparatus, where the apparatus comprises an augmented reality (AR) monitor; determine an identifier for the observed audio object based upon the determined direction of arrival; receive distributed audio capture application signals at the apparatus, where the distributed audio capture application signals comprise gain level information for individual audio object channels and identifiers for respective audio objects of the individual audio object channels; and associate a first one of the individual audio object channels with the observed audio object based upon the received identifier of the first individual audio object channel and the determined identifier.

The at least one memory and the computer program code may be configured to, with the at least one processor, cause the apparatus to, based upon the associating, render the first individual audio object channel to a user of the augmented reality (AR) monitor. The at least one memory and the computer program code may be configured to, with, the at least one processor, cause the apparatus to, based upon the associating, display on the augmented reality (AR) monitor a label with the observed audio object. The at least one memory and the computer program code may be configured to, with the at least one processor, cause the apparatus to: determine an identifier for a second observed audio object based upon the determined direction of arrival; and display on the augmented reality (AR) monitor a label for the second observed audio object corresponding to a second one of the individual audio object channels. The at least one memory and the computer program code may be configured to, with the at least one processor, cause the apparatus to, based upon the associating, displaying on the augmented reality (AR) monitor the gain level information for the first individual audio object channel. The distributed audio capture application signals may comprise mix metadata for mixing the individual audio object channels, and the at least one memory and the computer program code may be configured to, with the at least one processor, cause the apparatus to cause transmitting from the augmented reality (AR) monitor input from a user for changing the mix metadata. The input comprises at least one of: head tracking information, audio object level control information, observation point selection information, and selection of an individual audio object or a mix of audio objects. The at least one memory and the computer program code may be configured to, with the at least one processor, cause the apparatus to receive requested additional audio object metadata based upon the transmitted input from the user. The at least one memory and the computer program code may be configured to, with the at least one processor, cause the apparatus to, based upon movement of the augmented reality (AR) monitor from a first location to a second different location, determine a new direction of arrival of the observed audio object. The at least one memory and the computer program code may be configured to, with the at least one processor, cause the apparatus to use of an image from a camera at the augmented reality (AR) monitor to determine of the direction of arrival (DOA).

An example apparatus may be provided in a non-transitory program storage device, such as memory 52 shown in FIG. 3 for example, readable by a machine, tangibly embodying a program of instructions executable by the machine for performing operations, the operations comprising: determining a direction of arrival (DOA) from an observed audio object to an observation point at an augmented reality (AR) monitor; determining an identifier for the observed audio object based upon the determined direction of arrival; based upon receiving distributed audio capture application signals at the augmented reality (AR) monitor, where the distributed audio capture application signals comprise gain level information for individual audio object channels and identifiers for respective audio objects of the individual audio object channels, associating a first one of the individual audio object channels with the observed audio object based upon the received identifier of the first individual audio object channel and the determined identifier.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

An example embodiment may be provided in an apparatus comprising means for determining a direction of arrival (DOA) from an observed audio object to an observation point at an augmented reality (AR) monitor; means for determining an identifier for the observed audio object based upon the determined direction of arrival; means for receiving distributed audio capture application signals at the augmented reality (AR) monitor, where the distributed audio capture application signals comprise gain level information for individual audio object channels and identifiers for respective audio objects of the individual audio object channels; and means for associating a first one of the individual audio object channels with the observed audio object based upon the received identifier of the first individual audio object channel and the determined identifier.

An example method may comprise determining and tracking a position of an observed sound source to an observation point at an audio monitoring device; determining an identifier for the observed sound source based upon the determined and tracked position of the observed sound source; receiving distributed audio capture application signals at the audio monitoring device, where the distributed audio capture application signals comprise at least one audio mixing parameter for individual audio object channels and identifiers for respective audio objects of the individual audio object channels; and associating a first one of the individual audio object channels with the observed sound source based upon the received identifier of the first individual audio object channel and the determined identifier.

The method may further comprise, based upon the associating, rendering the first individual audio object channel to a user of the audio monitoring device. There are many different implementation possibilities. For example, such rendering may be provided from another device or entity (rather than directly from the audio monitoring device). In alternative embodiments, the monitoring device may be used for monitoring only, but rendering/playback may be achieved from other entities such as another device, cloud or database. Whatever is being modified can be instantly transmitted/provided to another entity. For example, the user may be wearing a headset/headtracking device which may be wirelessly connected to the audio monitoring device. The method may further comprise, based upon the associating, displaying on the audio monitoring device a label with the observed sound source. The method may further comprise determining an identifier for a second observed sound source based upon the determining and tracking a position of the second observed sound source; and displaying on the audio monitoring device a label for the second observed sound source corresponding to a second one of the individual audio object channels. The method may further comprise, based upon the associating, displaying on the audio monitoring device at least one audio mixing parameter for the first individual audio object channel. The distributed audio capture application signals may comprise mix metadata for mixing the individual audio object channels, and the method may further comprise transmitting from the audio monitoring device input from a user for changing the mix metadata. The input may comprise at least one of: head tracking information, audio object level control information, observation point selection information, and selection of an individual observed sound source or a mix of the observed sound sources. The method may further comprise receiving requested additional audio object metadata based upon the transmitted input from the user. Based upon movement of the audio monitoring device from a first location to a second different location, the method may comprise determining a new direction of arrival from the observed sound source. The determining of the determining and tracking position of the observed sound source may comprise use of an image from a camera at the audio monitoring device.

An example apparatus may comprise at least one processor; and at least one non-transitory memory including computer program code, the at least one memory and the computer program code configured to, with the at least one processor, cause the apparatus to: determine and track a position of an observed sound source to an observation point of the apparatus, where the apparatus comprises an audio monitoring device; determine an identifier for the observed sound source based upon the determined and tracked position of the observed sound source; receive distributed audio capture application signals at the apparatus, where the distributed audio capture application signals comprise at least one audio mixing parameter for individual audio object channels and identifiers for respective audio objects of the individual audio object channels; and associate a first one of the individual audio object channels with the observed sound source based upon the received identifier of the first individual audio object channel and the determined identifier.

The at least one memory and the computer program code may be configured to, with the at least one processor, cause the apparatus to, based upon the associating, render the first individual audio object channel to a user of the audio monitoring device. The at least one memory and the computer program code may be configured to, with the at least one processor, cause the apparatus to, based upon the associating, display on the audio monitoring device a label with the observed sound source. The at least one memory and the computer program code may be configured to, with the at least one processor, cause the apparatus to: determine an identifier for a second observed sound source based upon a determined and tracked position of the second observed sound source; and display on the audio monitoring device a label for the second observed sound source corresponding to a second one of the individual audio object channels. The at least one memory and the computer program code may be configured to, with the at least one processor, cause the apparatus to, based upon the associating, displaying on the audio monitoring device the at least one audio mixing parameter for the first individual audio object channel. The distributed audio capture application signals may comprise mix metadata for mixing the individual audio object channels, and where the at least one memory and the computer program code may be configured to, with the at least one processor, cause the apparatus to cause transmitting from the audio monitoring device input from a user for changing the mix metadata. The input may comprise at least one of: head tracking information, audio object level control information, observation point selection information, and selection of an individual audio object or a mix of audio objects. The at least one memory and the computer program code may be configured to, with the at least one processor, cause the apparatus to receive requested additional audio object metadata based upon the transmitted input from the user. The at least one memory and the computer program code may be configured to, with the at least one processor, cause the apparatus to, based upon movement of the audio monitoring device from a first location to a second different location, determine a new direction of arrival from the observed sound source. The at least one memory and the computer program code may be configured to, with the at least one processor, cause the apparatus to use of an image from a camera at the audio monitoring device to determine of a direction of arrival (DOA).

An example embodiment may be provided in a non-transitory program storage device readable by a machine, tangibly embodying a program of instructions executable by the machine for performing operations, the operations comprising: determining and tracking a position of an observed sound source to an observation point at an audio monitoring device; determining an identifier for the observed sound source based upon the determined and tracked position of the observed sound source; based upon receiving distributed audio capture application signals at the audio monitoring device, where the distributed audio capture application signals comprise at least one audio mixing parameter for individual audio object channels and identifiers for respective audio objects of the individual audio object channels, associating a first one of the individual audio object channels with the observed sound source based upon the received identifier of the first individual audio object channel and the determined identifier.

With features as described herein, the a user is allowed to freely move (virtually) in the scene from the position of the monitoring device because the monitoring device receives audio channels and tracker ID information. Such monitoring may be achieved by the aid of head tracking as well.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   determining and tracking a position of an observed sound source relative to an observation point at an audio monitoring device;
   determining an identifier for the observed sound source based upon the determined and tracked position of the observed sound source;
   receiving distributed audio capture application signals at the audio monitoring device, where the distributed audio capture application signals comprise at least one audio mixing parameter for individual audio object channels and identifiers for respective audio objects of the individual audio object channels;
   associating a first one of the individual audio object channels with the observed sound source based upon the received identifier of the first individual audio object channel and the determined identifier; and
   based upon the associating, rendering the first individual audio object channel to a user of the audio monitoring device with use of the at least one audio mixing parameter and/or recording the first individual audio object channel with use of the at least one audio mixing parameter.

2. A method as in claim 1 further comprising at least one of:
   based upon the associating, displaying on the audio monitoring device a label with the observed sound source; or
   based upon the associating, displaying on the audio monitoring device the at least one audio mixing parameter for the first individual audio object channel.

3. A method as in claim 2 further comprising:
   determining an identifier for a second observed sound source based upon determining and tracking a position of the second observed sound source; and
   displaying on the audio monitoring device a label for the second observed sound source corresponding to a second one of the individual audio object channels.

4. A method as in claim 1 where the distributed audio capture application signals comprise metadata for mixing the individual audio object channels, and the method further comprises transmitting from the audio monitoring device input from a user for changing the metadata.

5. A method as in claim 4 further comprising receiving requested additional audio object metadata based upon the transmitted input from the user.

6. A method as in claim 1 where, based upon movement of the audio monitoring device from a first location to a second different location, determining a new direction of arrival from the observed sound source.

7. A method as in claim 1 where the determining and tracking of the position of the observed sound source comprises use of an image from a camera at the audio monitoring device.

8. A method as in claim 1 where the determining and tracking of the position of the observed sound source comprises use of at least one sensor to sense a location of the observed sound source relative to the observation point.

9. An apparatus comprising:
   at least one processor; and
   at least one non-transitory memory including computer program code, the at least one memory and the computer program code configured to, with the at least one processor, cause the apparatus to:
   determine and track a position of an observed sound source relative to an observation point of the apparatus, where the apparatus comprises an audio monitoring device;
   determine an identifier for the observed sound source based upon the determined and tracked position of the observed sound source;
   receive distributed audio capture application signals at the apparatus, where the distributed audio capture application signals comprise at least one audio mixing parameter for individual audio object channels and identifiers for respective audio objects of the individual audio object channels;
   associate a first one of the individual audio object channels with the observed sound source based upon the received identifier of the first individual audio object channel and the determined identifier; and based upon the associating, render the first individual audio object channel to a user of the audio monitoring device with use of the at least one audio mixing parameter and/or record the first individual audio object channel with use of the at least one audio mixing parameter.

10. An apparatus as in claim 9 where the at least one memory and the computer program code are configured to, with the at least one processor, cause the apparatus to, based upon the associating, display on the audio monitoring device a label with the observed sound source.

11. An apparatus as in claim 10 where the at least one memory and the computer program code are configured to, with the at least one processor, cause the apparatus to:
    determine an identifier for a second observed sound source based upon a determined and tracked position of the second observed sound source; and
    display on the audio monitoring device a label for the second observed sound source corresponding to a second one of the individual audio object channels.

12. An apparatus as in claim 11 where the at least one memory and the computer program code are configured to, with the at least one processor, cause the apparatus to, based upon the associating, display on the audio monitoring device a label with the observed sound source.

13. An apparatus as in claim 9 where the distributed audio capture application signals comprise metadata for mixing the individual audio object channels, and where the at least one memory and the computer program code are configured to, with the at least one processor, cause the apparatus to transmit from the audio monitoring device an input from the user for changing the metadata.

14. An apparatus as in claim 13 where the input comprises at least one of:
    head tracking information,
    audio object level control information,
    observation point selection information, or
    of an individual audio object or a mix of audio objects.

15. An apparatus as in claim 9 where the at least one memory and the computer program code are configured to, with the at least one processor, cause the apparatus to receive requested additional audio object metadata based upon transmitted input from the user.

16. An apparatus as in claim 9 where the at least one memory and the computer program code are configured to, with the at least one processor, cause the apparatus to, based upon movement of the audio monitoring device from a first location to a second different location, determine a new direction of arrival from the observed sound source.

17. An apparatus as in claim 9 where the at least one memory and the computer program code are configured to, with the at least one processor, cause the apparatus to use of an image from a camera at the audio monitoring device to determine of a direction of arrival (DOA).

18. An apparatus as in claim 9 where the apparatus comprises at least one sensor, where the at least one memory and the computer program code configured to, with the at least one processor, cause the apparatus to use the at least one sensor to determine and track the position of the observed sound source relative to the observation point.

19. A method comprising:
  determining a direction of arrival of an observed sound source relative to an observation point with an audio monitoring device;
  determining an identifier for the observed sound source based upon the determined direction of arrival;
  receiving distributed audio capture application signals at the audio monitoring device, where the distributed audio capture application signals comprise at least one audio mixing parameter for individual audio object channels and identifiers for respective audio objects of the individual audio object channels;
  associating a first one of the individual audio object channels with the observed sound source based upon the received identifier of the first individual audio object channel and the determined identifier; and
  rendering the first individual audio object channel to a user of the audio monitoring device with use of the at least one audio mixing parameter and/or recording the first individual audio object channel with use of the at least one audio mixing parameter.

20. A non-transitory program storage device readable by a machine, tangibly embodying a program of instructions executable by the machine for performing operations, the operations comprising the method claimed in claim 19.

21. An apparatus comprising:
  at least one processor; and
  at least one non-transitory memory including computer program code, the at least one memory and the computer program code configured to, with the at least one processor, cause the apparatus to:
    determine a direction of arrival of an observed sound source relative to an observation point of the apparatus, where the apparatus comprises an audio monitoring device;
    determine an identifier for the observed sound source based upon the determined direction of arrival;
    receive distributed audio capture application signals at the apparatus, where the distributed audio capture application signals comprise at least one audio mixing parameter for individual audio object channels and identifiers for respective audio objects of the individual audio object channels;
    associate a first one of the individual audio object channels with the observed sound source based upon the received identifier of the first individual audio object channel and the determined identifier;
  where the at least one memory and the computer program code are further configured to, with the at least one processor, cause the apparatus to:
    render the first individual audio object channel to a user of the apparatus with use of the at least one audio mixing parameter; and/or
    record the first individual audio object channel with use of the at least one audio mixing parameter.

* * * * *

UNITED STATES PATENT AND TRADEMARK OFFICE
CERTIFICATE OF CORRECTION

PATENT NO. : 10,754,608 B2
APPLICATION NO. : 15/363458
DATED : August 25, 2020
INVENTOR(S) : Sujeet Shyamsundar Mate and Arto Lehtiniemi Page 1 of 1

It is certified that error appears in the above-identified patent and that said Letters Patent is hereby corrected as shown below:

In the Claims

In Claim 4, Column 13, Line 48, before "input" insert --an--; delete "a" and replace with --the--.

In Claim 7, Column 13, Line 56, delete "I" and replace with --1--.

In Claim 10, Column 14, Line 29, delete "a label with the observed sound source" and replace with --the at least one audio mixing parameter for the first individual audio object channel.--.

In Claim 14, Column 14, Line 56, before "of" insert --selection--.

Signed and Sealed this
Thirteenth Day of October, 2020

Andrei Iancu
*Director of the United States Patent and Trademark Office*